United States Patent
Watanabe et al.

(10) Patent No.: US 6,174,261 B1
(45) Date of Patent: Jan. 16, 2001

(54) SPEED CONTROLLER AND CONTROL METHODS OF CONTINUOUSLY VARIABLE TRANSMISSION

(75) Inventors: Mitsuru Watanabe, Hadano; Satoshi Takizawa, Yokohama; Yasushi Narita; Yuusuke Minagawa, both of Yokosuka; Masato Koga, Atsugi, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/330,145

(22) Filed: Jun. 11, 1999

(30) Foreign Application Priority Data

Jun. 15, 1998 (JP) .................................. 10-166855
Jun. 4, 1999 (JP) .................................. 11-157286

(51) Int. Cl.[7] .................................................. B60K 41/14
(52) U.S. Cl. .............................................. 477/43; 477/46
(58) Field of Search ...................................... 477/43–48

(56) References Cited

U.S. PATENT DOCUMENTS

| | | |
|---|---|---|
| 4,658,360 | 4/1987 | Osanai, et al. . |
| 4,710,879 * | 12/1987 | Vahabzadeh ........................ 477/46 X |
| 4,846,019 | 7/1989 | Kumura . |
| 4,872,115 | 10/1989 | Itoh et al. . |
| 5,319,999 | 6/1994 | Morishige et al. ..................... 477/46 |
| 5,782,719 * | 7/1998 | Adachi .................................. 477/46 |
| 5,788,599 * | 8/1998 | Adachi et al. ..................... 477/46 X |
| 5,820,514 * | 10/1998 | Adachi ................................ 477/46 |
| 5,857,937 * | 1/1999 | Ashizawa et al. .................... 477/46 |
| 5,984,829 * | 11/1999 | Minagawa et al. ............... 477/43 X |
| 6,007,452 * | 12/1999 | Sawada et al. ...................... 477/45 |
| 6,013,006 * | 1/2000 | Ashizawa et al. .................... 477/46 |

FOREIGN PATENT DOCUMENTS 8-258595 * 10/1996 (JP) .

* cited by examiner

Primary Examiner—Sherry Estremsky
(74) Attorney, Agent, or Firm—Foley & Lardner

(57) ABSTRACT

A first final target input rotation speed is calculated according to a throttle opening and a vehicle speed, and a second final target input rotation speed is calculated by applying an upper limit to the first final target input rotation speed. The upper limit is determined so as to reduce noise outside the vehicle. A second final target speed ratio is set from the vehicle speed and second final target input rotation speed, and a time constant of a speed ratio variation is determined from the vehicle speed and first final target input rotation speed. By transiently controlling the speed ratio variation using the second final target speed ratio and time constant thus obtained, an excessive increase of engine rotation speed is prevented while retaining a desirable feeling of acceleration when there is a kickdown operation of the vehicle.

8 Claims, 5 Drawing Sheets

SPEED CONTROLLER AND CONTROL METHODS OF CONTINUOUSLY VARIABLE TRANSMISSION

FIELD OF THE INVENTION

This invention relates to suppression of noise accompanying high engine rotation speed in a vehicle.

BACKGROUND OF THE INVENTION

In a continuously variable transmission (CVT), the variation of speed ratio when an accelerator pedal is fully depressed is set for example as follows.

First, the speed ratio is changed to a maximum value, i.e., the speed ratio at which an output rotation speed is lowest relative to an input rotation speed. Second, the engine rotation speed is increased to a maximum region, and a running speed is then increased by decreasing the speed ratio.

In this speed ratio control, the engine rotation speed remains in the maximum region for a long period from when the accelerator pedal is depressed to when the vehicle speed reaches the speed desired by the driver, and this causes a large noise outside the vehicle.

In order to solve this noise problem, Tokkai Hei 5-126239 published by the Japanese Patent office in 1993 discloses a method wherein a transient target speed ratio is set so that the engine rotation speed increases gradually for a sudden operation of the accelerator pedal.

According to this method, when the accelerator pedal is depressed, the engine rotation speed increases gradually due to the fact that the speed ratio changes to the maximum value comparatively slowly. In the period required to reach the vehicle speed depending on depression of the accelerator pedal, the time during which the engine rotation speed is in the maximum region is short, so vehicle noise due to acceleration is less.

SUMMARY OF THE INVENTION

However, when the time constant of the speed ratio variation is changed, the time required for the engine rotation speed to reach the maximum region is long, and as a result, there is less bodily perception of acceleration.

It is therefore an object of this invention to suppress noise outside a vehicle without affecting the bodily perception of acceleration.

In order to achieve the above object, this invention provides a speed ratio controller for use with a vehicle which runs under a drive force of an engine via a continuously variable transmission. The controller comprises a sensor for detecting a running condition of the vehicle, a sensor for detecting a vehicle speed, and a microprocessor programmed to calculate a first final target input rotation speed of the continuously variable transmission based on the running condition, calculate a second final target input rotation speed by limiting an upper limit of the first final target input rotation speed with a predetermined value, calculate a second final target speed ratio from the vehicle speed and second final target input rotation speed, calculate a first final target speed ratio from the vehicle speed and first final target input rotation speed, calculate a time constant of a speed ratio variation based on the first final target input rotation speed, set a transient target speed ratio from the second final target speed ratio and the time constant, and control a speed ratio of the continuously variable transmission to be equal to the transient target speed ratio.

This invention also provides a speed ratio control method for a vehicle which runs under a drive force of an engine via a continuously variable transmission. The method comprises detecting a running condition of the vehicle, detecting a vehicle speed, calculating a first final target input rotation speed of the continuously variable transmission based on the running condition, calculating a second final target input rotation speed by limiting an upper limit of the first final target input rotation speed with a predetermined value, calculating a second final target speed ratio from the vehicle speed and second final target input rotation speed, calculating a first final target speed ratio from the vehicle speed and first final target input rotation speed, calculating a time constant of a speed ratio variation based on the first final target input rotation speed, setting a transient target speed ratio from the second final target speed ratio and the time constant, and controlling a speed ratio of the continuously variable transmission to be equal to the transient target speed ratio.

The details as well as other features and advantages of this invention are set forth in the remainder of the specification and are shown in the accompanying drawings.

DESCRIPTION OF THE PREFERRED EMBODIMENTS

Figure 1:
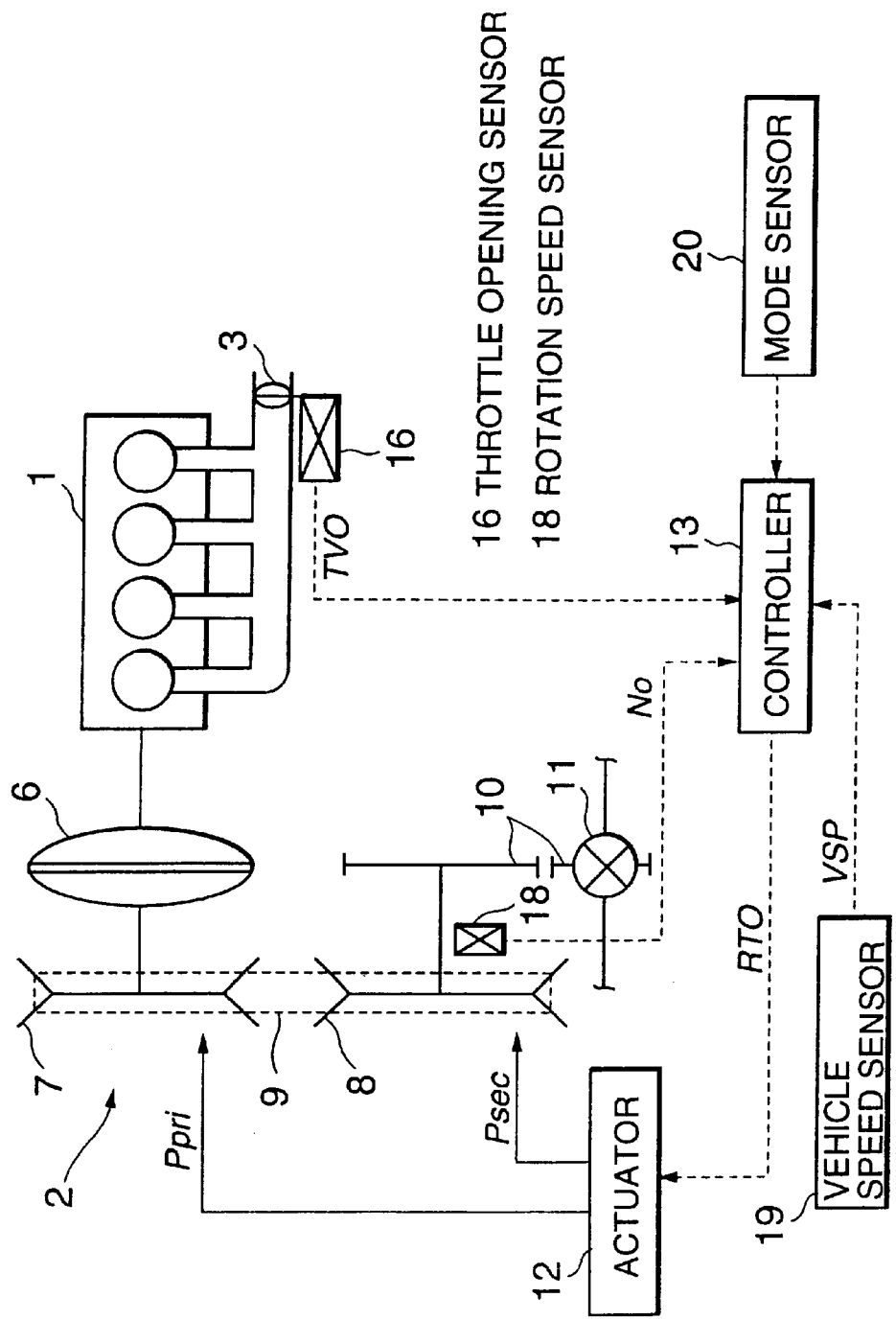
FIG. 1 is a schematic diagram of a speed ratio controller according to this invention.

Referring to FIG. 1 of the drawings, a rotation output of a vehicle engine 1 is input into a V-belt continuously variable transmission 2 via a torque converter 6.

The engine 1 is provided with a throttle 3 which opens and closes according to an operation of an accelerator pedal by a driver, and a mixture of air aspirated via the throttle 3 and fuel injected into the air is burnt to run the vehicle.

In the continuously variable transmission 2, a V-belt 9 is looped around a primary pulley 7 joined to the output shaft of the engine 1 via the torque converter 6, and a secondary pulley 8.

The secondary pulley 8 rotates drive wheels, not shown, via a final drive gear set 10 and differential gear set 11. The primary pulley 7 and secondary pulley 8 each comprise a V-shaped groove for looping the belt.

These grooves expand and contract according to oil pressures Ppri, Psec supplied from an actuator 12, and a speed ratio is varied by varying the contact radii of the V belt and pulleys according to the variation of groove width.

This speed ratio is controlled from a controller 13 according to a target speed ratio RTO output to the actuator 12 as a signal.

The controller 13 is a microcomputer comprising a central processing unit (CPU), read-only memory (ROM), random access memory (RAM) and input/output interface (I/O interface).

In order for the controller 13 to perform speed ratio control, signals are input to the controller 13 respectively from a throttle opening sensor 16 which detects a throttle opening TVO, a rotation speed sensor 18 which detects a rotation speed No of the secondary pulley 8, a vehicle speed sensor 19 which detects a vehicle speed VSP, and a mode sensor 20 which detects a vehicle running mode selected by a selector lever.

Figure 2:
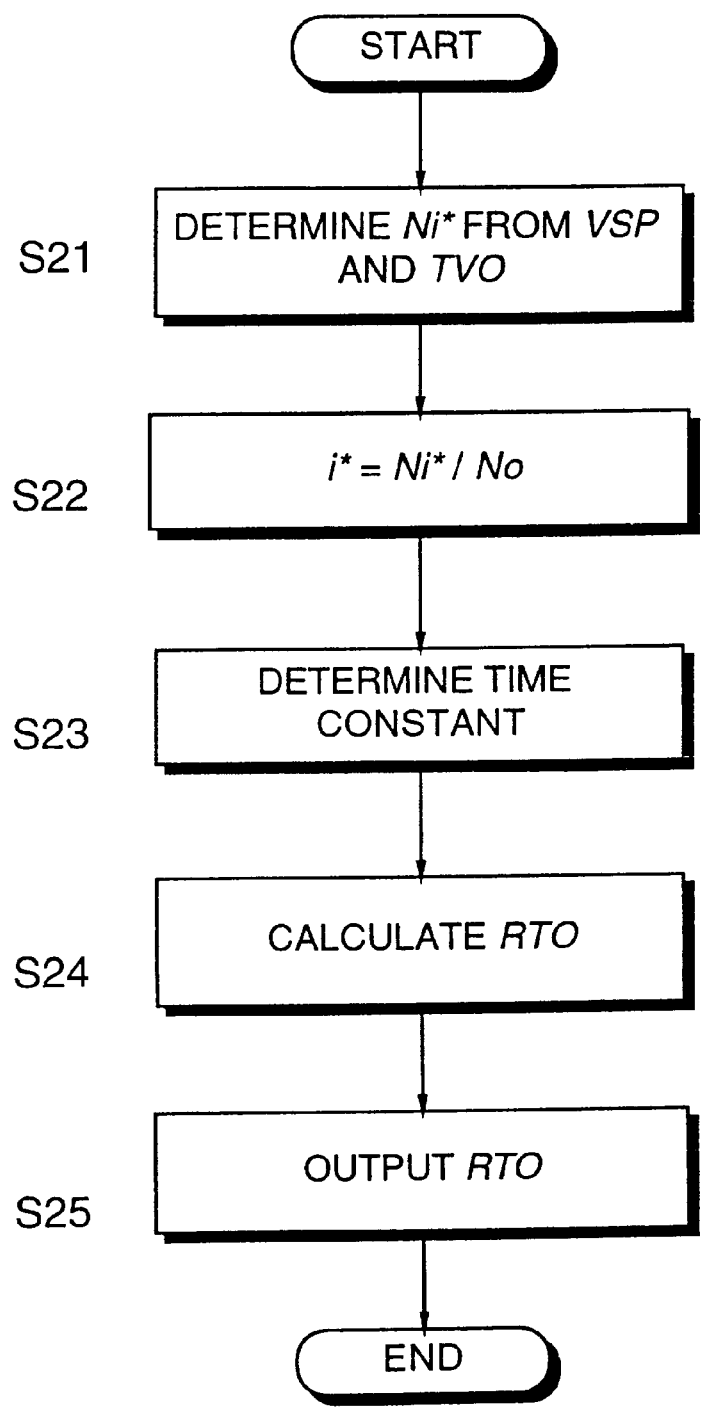
FIG. 2 is a flowchart describing a main routine of speed ratio control performed by the controller according to this invention.
Figure 3:
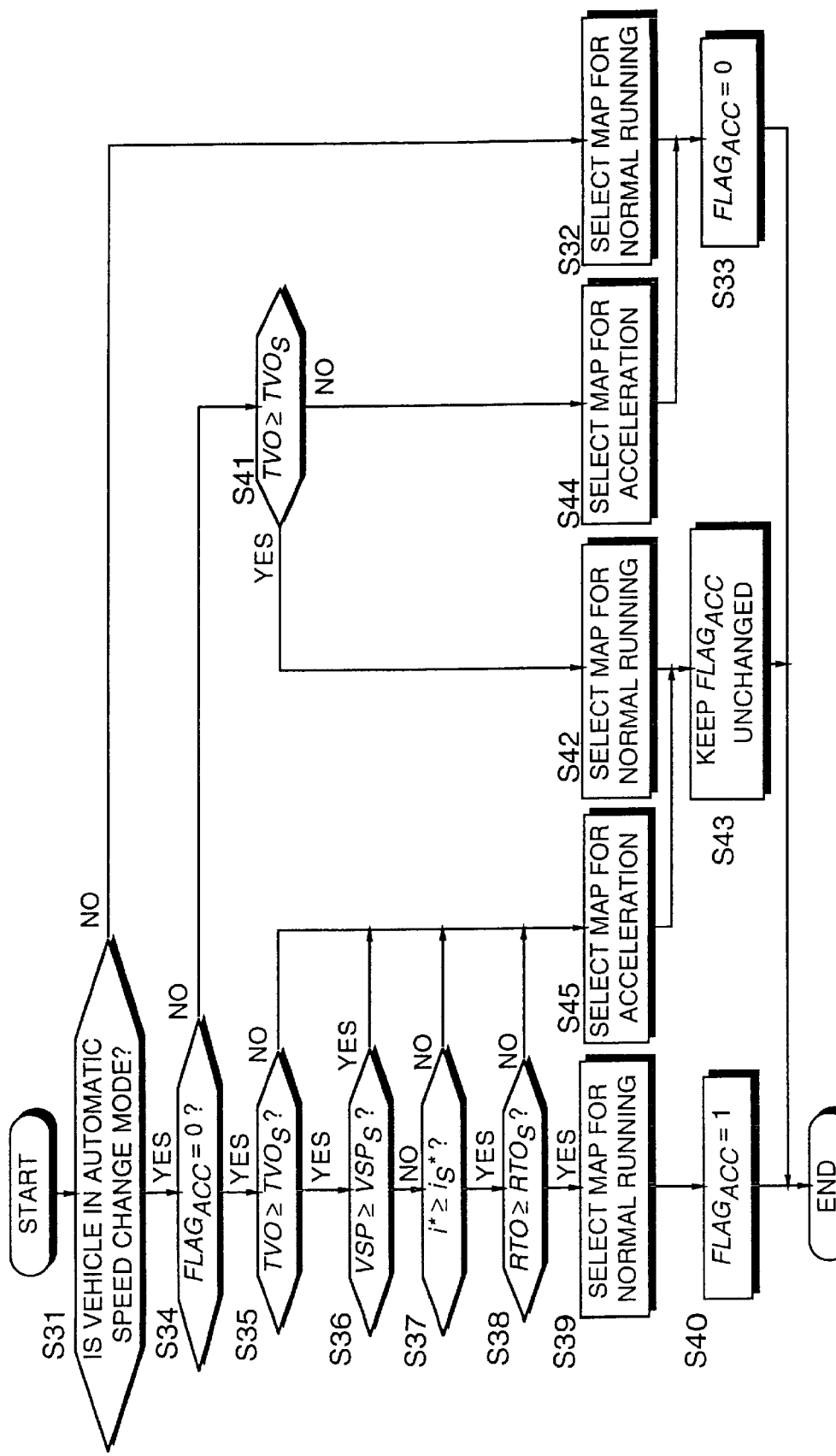
FIG. 3 is a flowchart describing a subroutine related to selection of a speed change pattern performed by the controller.

The controller 13 calculates the target speed ratio RTO by the main routine shown in FIG. 2 based on these input signals.

This routine is performed, for example, at an interval of 10 milliseconds.

Figure 4:
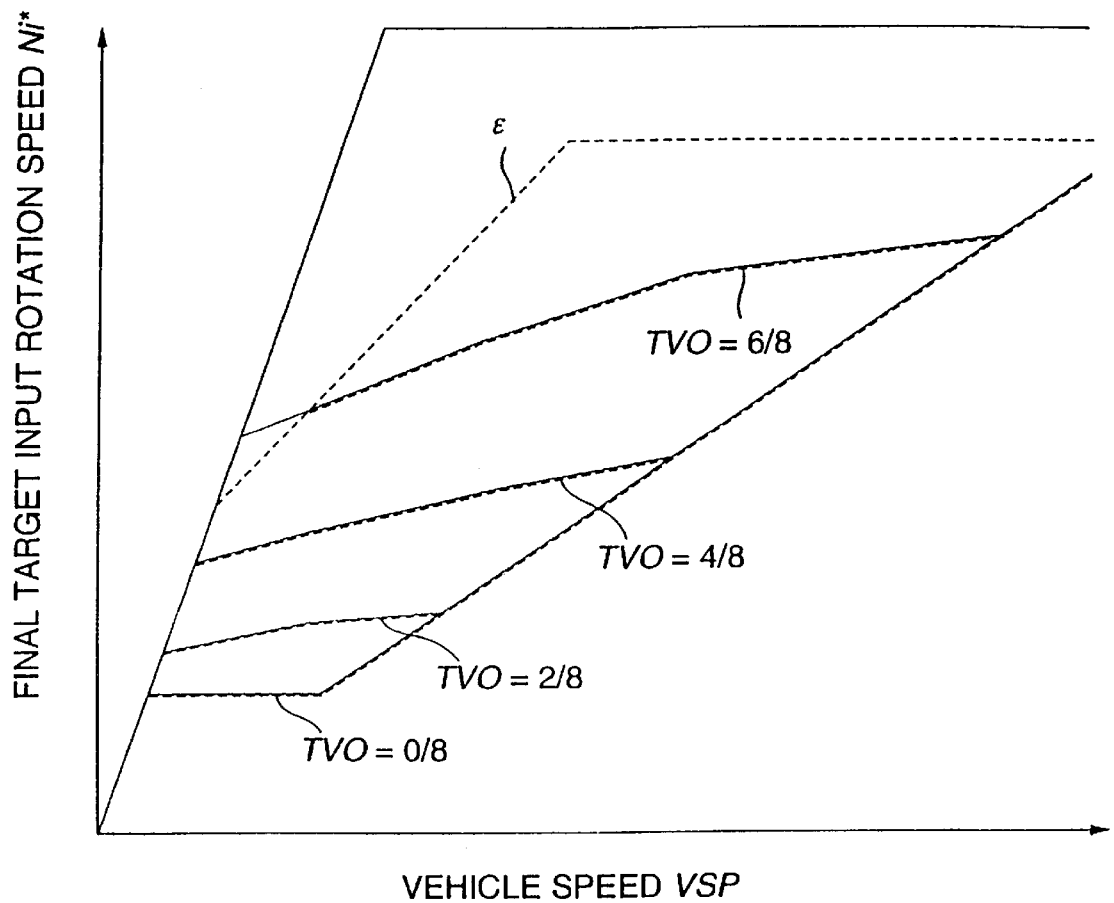
FIG. 4 is a diagram describing the contents of a final target input rotation speed map for normal running, and a final target input rotation speed map for acceleration, according to this invention.

First, in a step S21, a final target input rotating speed Ni* which the continuously variable transmission 2 should finally reach is found from the vehicle speed VSP and throttle opening TVO by referring to a map shown in FIG. 4. This map will be described in detail later.

In the following step S22, a final target speed ratio i* is computed by dividing the final target input rotating speed Ni* by a transmission output rotation speed No.

In a step S23, a time constant of the speed ratio variation is determined.

The time constant is determined according to a deviation between a transient target speed ratio $RTO_{-1}$ calculated on the immediately preceding occasion when the routine was performed and the final target ratio i* based on a final input rotation speed for normal running which will be described later. The method of determining the time constant is known from the aforesaid prior art Tokkai Hei 5-126239.

In a step S24, the transient target speed ratio RTO for achieving the final speed ratio i* under the time constant of the speed ratio variation determined in the step S24 is computed.

In a step S25, a signal corresponding to the transient target speed ratio RTO is output to the actuator 12, and the routine is terminated.

Next, the final target input rotation speed map of FIG. 4 used in the step S21 will be described.

In this diagram, two kinds of maps are used, i.e., a final input rotation speed for normal running shown as a solid line, and a final input rotation speed for acceleration shown by a broken line.

As shown by the broken line, ε, the final target input rotation speed for acceleration is obtained by applying a limit to the final target input rotating speed Ni* for normal running so that the noise level outside the vehicle is within a permitted level.

This upper limiting value is set to, for example, 5,600 rpm.

In the calculation of the step S23, the final input rotation speed for normal running is always applied. In the calculation of the step S21, two maps are selectively applied.

Next, a map selecting process for this purpose will be described. This process is a sub-routine of the main routine of FIG. 2 described above. The subroutine is performed at the same 10 milliseconds interval as the main routine.

In a step S31, the controller 13 determines whether or not the vehicle running mode selected by the selector lever is an automatic speed change mode (D).

When a mode other than the mode (D) is chosen, in a step S32, the final target input rotating speed map for normal running shown by the solid line of FIG. 4 is selected. The selected map is used for the calculation of final target input rotating speed in the step S21 when the main routine of FIG. 2 is next performed.

Subsequently, in a step S33, a vehicle start flag $FLAG_{ACC}$ is reset to 0, and the subroutine is terminated. When the vehicle start flag $FLAG_{ACC}=1$, it shows that the vehicle is accelerating during the vehicle start and when the vehicle start flag $FLAG_{ACC}=0$, it shows that other conditions hold.

When it is determined that the mode (D) is selected in the step S31, the subroutine proceeds to a step S34. Here, it is determined whether or not the vehicle start flag $FLAG_{ACC}$ set on the immediately preceding occasion when the subroutine was performed is 0.

When the vehicle start flag $FLAG_{ACC}$ is 0, the routine proceeds to a step S35.

In the step S35, it is determined whether or not the throttle opening TVO is equal to or greater than a set opening $TVO_S$. The set opening $TVO_S$ may, for example, be ⅛, where ⅝ denotes full throttle opening.

When the throttle opening TVO is equal to or greater than the set opening $TVO_S$, the routine proceeds to a step S36, and it is determined whether or not the vehicle speed VSP is equal to or higher than a set vehicle speed $VSP_S$. The set vehicle speed $VSP_S$ is set to, for example, 30km/hr.

When the vehicle speed VSP is less than the set vehicle speed $VSP_S$, the routine proceeds to a step S37, and it is determined whether or not the final target speed ratio i* is equal to or greater than a set final target speed ratio $i_S^*$, i.e., whether or not the final target speed ratio i* gives a lower vehicle speed than the set final target speed ratio $i_S^*$. The set final target speed ratio $i_S^*$ is set to, for example, 1.8.

When the final target speed ratio i* is equal to or greater than the set final target speed ratio $i_S^*$, the routine proceeds to a step S38, and it is determined whether or not the transient target speed ratio RTO is equal to or greater than a set value $RTO_O$, i.e., whether or not the transient target speed ratio RTO gives a lower vehicle speed than the set value $RTO_O$. The set value $RTO_O$ is set to, for example, 1.8.

In the step S38, when the transient target speed ratio RTO is equal to or greater than the set value $RTO_O$, it is determined that the vehicle is accelerating during startup.

In this case, the map of final target input rotating speed for normal running, i.e., the map shown by the solid line of FIG. 4, is selected in a step S39. Due to this, in the step S21 of the main routine, the calculation of the final target input rotating speed Ni* is performed using the map of final target input rotating speed for normal running.

Further, in a step S40, the vehicle start flag $FLAG_{ACC}$ is set to 1, and the subroutine is terminated.

On the other hand, when the throttle opening TVO is less than the set opening $TVO_S$ in the step S35, when the vehicle speed VSP is equal to or higher than the set vehicle speed $VSP_S$ in the step S36, when the final target speed ratio i* is less than the set value in the step S37, or when the transient target speed ratio RTO is less than the set value $RTO_O$ in a step S38, the routine proceeds to a step S45, and the map of final target input rotation speed for acceleration is selected. However, as will be understood from FIG. 4, the map of final target input rotation speed for acceleration gives a different value from the map of final target input rotation speed for normal running only when the throttle opening TVO is equal to or greater than the set opening $TVO_S$, and the vehicle speed VSP is equal to or higher than the set vehicle speed $VSP_S$.

According to this subroutine, the map of final target input rotation speed for acceleration is chosen in the step S45 even when the vehicle is accelerating under a small throttle opening TVO after starting. However, in this case, the map of final target input rotation speed for acceleration supplies the same final target input rotation speed Ni* as the map of final target input rotation speed for normal running, so there is no effect on the transient target speed ratio RTO calculated in the main routine, and ordinary speed ratio control is in fact performed. This is the same as when proceeding to the step S45 from the step S37 or step S38.

Conversely, when proceeding to the step S45 from the step S36, selecting the map of final target input rotation speed for acceleration is meaningful. This will be described in detail later.

When the vehicle start flag $FLAG_{ACC}$ was set to 1 in the step S40, the process proceeds from the step S34 to the step S41 on the next occasion the subroutine is performed.

In the step S41, it is determined whether or not the throttle opening TVO is larger than the set opening $TVO_S$.

When the throttle opening TVO is larger than the set opening $TVO_S$, it implies that the acceleration state when the process was performed on the immediately preceding occasion, is still continuing. In this case, in a step S42 as in the step S39, the map of final target input rotation speed for normal running is selected, the vehicle start flag $FLAG_{ACC}$ is retained at its current value in a step S43, and the process is terminated.

Also on the next occasion the process is performed, provided that the throttle opening TVO is equal to or greater than the set opening $TVO_S$ in the step S41, i.e., provided that the acceleration state continues, the process from the step S41 to the step S43 is repeated, and speed ratio control continues using the map of final target input rotation speed for normal running.

In the step S41, when it is determined that the throttle opening TVO is less than the set opening $TVO_S$, it means that the accelerator pedal depression amount has decreased from the state when the vehicle was accelerating for vehicle startup, i.e., the vehicle speed has been stabilized. In this case, the process proceeds to a step S44, the map of final target input rotation speed for acceleration is selected, the vehicle start flag $FLAG_{ACC}$ is reset to 0 in the step S33, and the process is terminated.

Even if the map of final target input rotation speed for acceleration is selected in the step S44, since the throttle opening TVO is less than the set opening $TVO_S$, the actual speed ratio characteristics are not different from the case where the map of final target input rotation speed for normal running is selected.

Therefore, speed ratio control in this case effectively uses the same map as that used for speed ratio control in the normal state.

Now, when the vehicle start flag $FLAG_{ACC}$ is reset to 0 in the step S33, the process proceeds to the step S35 from the step S34 on the next occasion when the subroutine is performed.

When the throttle opening TVO is less than the set opening $TVO_S$ in the step S35, the routine proceeds to a step S45, and the map of final target input rotation speed for acceleration is selected. However, since the throttle opening TVO is less than the set opening $TVO_S$, the actual speed characteristics are not different from the case where the map of final target input rotation speed for normal running is selected, as described hereabove.

In this case, the subroutine is terminated in the following step S43 while the vehicle start flag $FLAG_{ACC}$ is maintained at 0.

On the other hand, when the throttle opening TVO is larger than the set opening $TVO_S$ in the step S35, it means that acceleration was performed again after the accelerator pedal depression amount decreases.

In this case, it is determined whether or not the vehicle speed VSP is higher than the set vehicle speed $VSP_S$ in the following step S36. When the vehicle speed VSP is higher than the set vehicle speed $VSP_S$, the map of final target input rotation speed for acceleration is selected. This case is a case where the vehicle is not accelerated from rest, while the accelerator pedal is largely depressed and the vehicle is running at or above the set vehicle speed $VSP_S$.

Hence, in the step S21 of the main routine performed using the map of final target input rotation speed for acceleration, the final target input rotation speed Ni* is limited to the upper limiting value $\epsilon$. Thereby, the noise outside the vehicle until the final target speed ratio i* is attained, i.e., until the vehicle speed desired by the driver is reached, is maintained within permissible limits.

On the other hand, the calculation of the time constant of the speed ratio variation in the step S23 is performed using the final target ratio i* for normal running.

In other words, although the engine rotation speed is limited to the upper limiting value $\epsilon$, the variation rate of speed ratio until the final speed ratio i* is attained, is the same as that of the case where the upper limiting value $\epsilon$ is not provided, so the perception of acceleration is not lost.

Figures 5A, 5B:
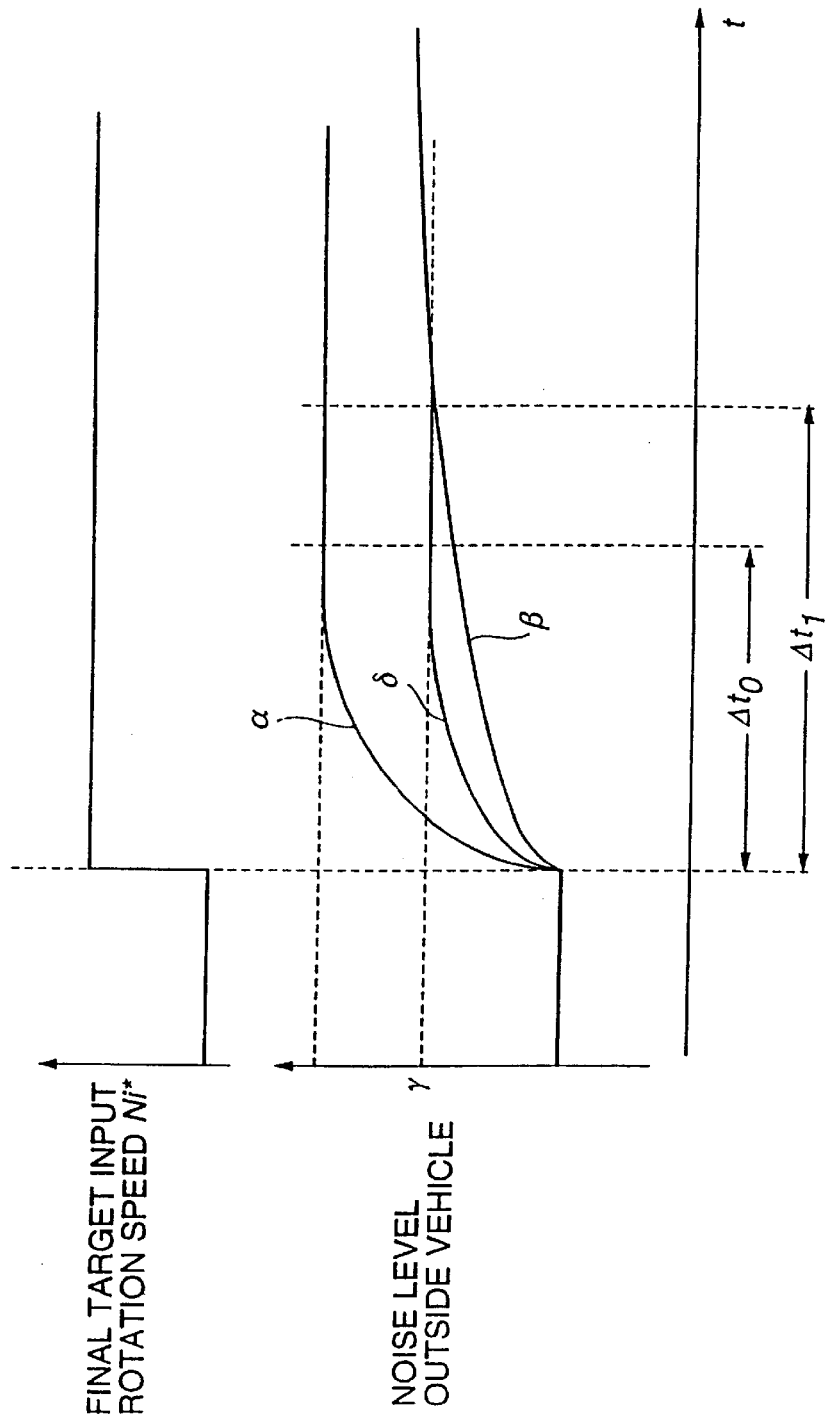
FIGS. 5A and 5B are timing charts which describe the variation of a final target input rotating speed and the noise level outside a vehicle according to this invention.

The effectiveness of this control will now be compared with that of the aforesaid prior art example referring to FIGS. 5A, 5B. If the accelerator pedal is depressed at a time t while the vehicle is running, the final target input rotation speed Ni* increases rapidly.

At that time, if the final input rotation speed Ni* is not limited to the upper limiting value $\epsilon$, the level of ambient noise outside the vehicle increases as shown by the curve $\alpha$ in FIG. 5B.

If the final target input rotation speed Ni* is limited to the upper limiting value $\epsilon$ by the method of the aforesaid prior art example, the noise can be suppressed to or less than a permitted level $\gamma$, as shown by the curve $\beta$ in FIG. 5B.

However, a period $\rightarrow t_1$ until the final target speed ratio i* is attained is longer than a period $\rightarrow t_0$ until the final target speed ratio i* is attained when the final target input rotation speed Ni* is not limited, and the feeling of acceleration is lost.

On the other hand, according to this embodiment, the period required for the speed change can be set to the same period $\rightarrow t_0$ as in the case where no limit is applied to the final target input rotation speed Ni*, while at the same time suppressing the noise outside the vehicle to or below the permitted level $\gamma$ as shown by the curve $\delta$.

In the above embodiment, the final target input rotation speed for normal running corresponds to a first final target input rotation speed, and the final target input rotation speed for acceleration corresponds to a second final target input rotation speed.

This invention was described in the context of its application to a speed ratio control of a belt-type continuously variable transmission, but it may be applied also to a toroidal type continuously variable transmission.

The contents of Tokugan Hei 10-166855, with a filing date of Jun. 15, 1998 in Japan, and Tokugan Hei 11-157286, with a filing date of Jun. 4, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows.

What is claimed is:

1. A speed ratio controller for use with a vehicle which runs under a drive force of an engine via a continuously variable transmission, said controller comprising:
    a first sensor for detecting a throttle condition of said vehicle,
    a second sensor for detecting a vehicle speed, and
    a microprocessor programmed to:
        calculate a first final target input rotation speed of said continuously variable transmission based on said throttle condition and vehicle speed,
        calculate a second final target input rotation speed by limiting an upper limit of said first final target input rotation speed with a predetermined value,
        calculate a second final target speed ratio from said vehicle speed and second final target input rotation speed,
        calculate a first final target speed ratio from said vehicle speed and first final target input rotation speed,
        calculate a time constant of a speed ratio variation based on said first final target input rotation speed,
        set a transient target speed ratio from said second final target speed ratio and said time constant, and
        control a speed ratio of said continuously variable transmission to be equal to said transient target speed ratio.

2. A speed ratio controller as defined in claim 1, wherein said microprocessor is programmed to repeat a speed ratio control at a predetermined interval, and calculate said time constant based on a deviation between said first final target speed ratio calculated on a present occasion and said transient target speed ratio calculated on an immediately preceding occasion when the speed ratio control was performed.

3. A speed ratio controller as defined in claim 1, wherein said first sensor comprises a sensor for detecting a throttle opening of said engine.

4. A speed ratio controller as defined in claim 3, wherein said microprocessor is programmed to set said second final target input rotation speed equal to said first final target input rotation speed when said throttle opening is smaller than a predetermined opening.

5. A speed ratio controller as defined in claim 3, wherein said microprocessor is programmed to set said second final target input rotation speed equal to said first final target input rotation speed when said vehicle speed is less than a predetermined speed.

6. A speed ratio controller as defined in claim 1, wherein said predetermined value is set based on a noise level outside the vehicle generated by said engine.

7. A speed ratio controller for use with a vehicle which runs under a drive force of an engine via a continuously variable transmission, said controller comprising:
    a first sensor for detecting a throttle condition of said vehicle,
    a second sensor for detecting a vehicle speed,
    means for calculating a first final target input rotation speed of said continuously variable transmission based on said throttle condition and vehicle speed,
    means for calculating a second final target input rotation speed by limiting an upper limit of said first final target input rotation speed with a predetermined value,
    means for calculating a second final target speed ratio from said vehicle speed and second final target input rotation speed,
    means for calculating a first final target speed ratio from said vehicle speed and first final target input rotation speed,
    means for calculating a time constant of a speed ratio variation based on said first final target input rotation speed,
    means for setting a transient target speed ratio from said second final target speed ratio and said time constant, and
    means for controlling a speed ratio of said continuously variable transmission to be equal to said transient target speed ratio.

8. A speed ratio control method for a vehicle which runs under a drive force of an engine via a continuously variable transmission, said method comprising:
    detecting a throttle condition of said vehicle,
    detecting a vehicle speed,
    calculating a first final target input rotation speed of said continuously variable transmission based on said throttle condition and vehicle speed,
    calculating a second final target input rotation speed by limiting an upper limit of said first final target input rotation speed with a predetermined value,
    calculating a second final target speed ratio from said vehicle speed and second final target input rotation speed,
    calculating a first final target speed ratio from said vehicle speed and first final target input rotation speed,
    calculating a time constant of a speed ratio variation based on said first final target input rotation speed,
    setting a transient target speed ratio from said second final target speed ratio and said time constant, and
    controlling a speed ratio of said continuously variable transmission to be equal to said transient target speed ratio.

* * * * *